J. L. CREVELING.
ELECTRIC REGULATION.
APPLICATION FILED NOV 5, 1910.

1,178,497.

Patented Apr. 11, 1916.

WITNESSES:

INVENTOR

UNITED STATES PATENT OFFICE.

JOHN L. CREVELING, OF NEW YORK, N. Y., ASSIGNOR TO SAFETY CAR HEATING AND LIGHTING COMPANY, A CORPORATION OF NEW JERSEY.

ELECTRIC REGULATION.

1,178,497.        Specification of Letters Patent.        Patented Apr. 11, 1916.

Application filed November 5, 1910. Serial No. 590,835.

*To all whom it may concern:*

Be it known that I, JOHN L. CREVELING, a resident of New York, in the county and State of New York, have invented certain new and useful Improvements in Electric Regulation, as set forth in the annexed specification and drawing, forming a part thereof.

My invention pertains to that class of electric regulation wherein it is desired to regulate an electric circuit in a predetermined manner.

My invention has for its particular object to provide means whereby the voltage impressed upon a translating circuit may be held constant through changes in voltage at the source from which said circuit is fed.

As my invention is particularly applicable to that class of systems wherein a generator is used to charge a storage battery and operate lamps or other translating devices, it will be described with reference to such a system.

Figure 1:
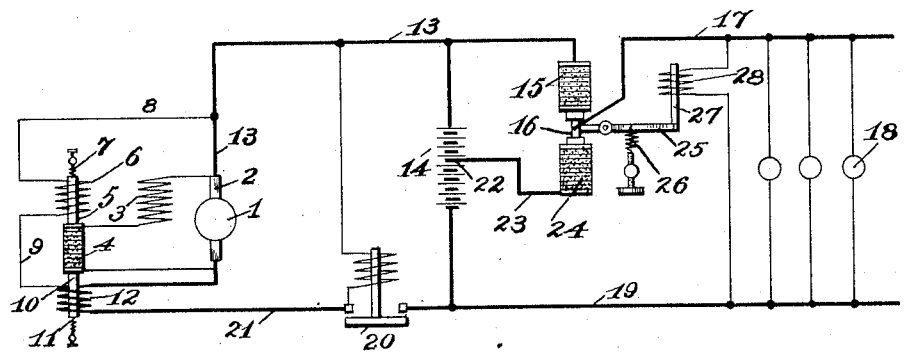
Figure 2:
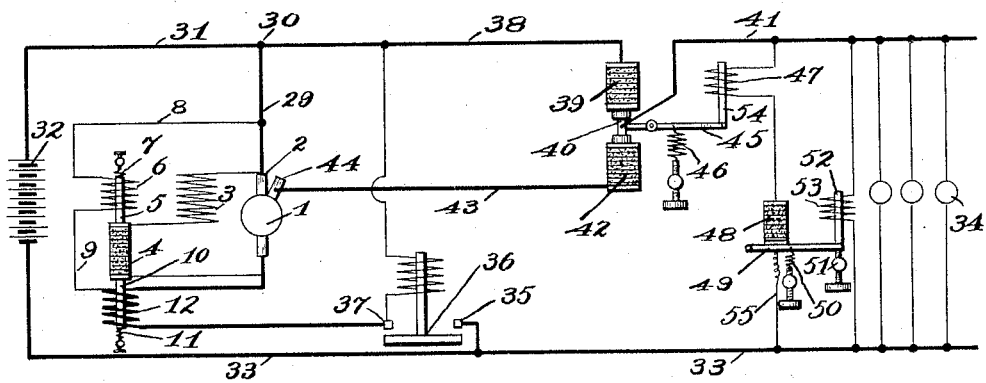

In the drawing, Figure 1 is a diagrammatic representation of one type of such system employing my invention. Fig. 2 is a modified form of system employing my invention.

In the drawing, Figs. 1 and 2, 1 represents a dynamo or generator, the main positive brush of which is indicated at 2.

3 represents the usual field winding which is shown as having in series therewith a variable resistance 4 indicated as a carbon pile, the operation of which is well known in the art.

5 is an iron core surrounded by the solenoid 6 and normally pressed in such direction as to compact the pile 4 and reduce its resistance as by means of adjustable screw 7. The coil 6, when energized, tends to move the core 5 against the action of spring 7 and increase the resistance 4 and prevent the generator voltage from exceeding a certain predetermined amount, which may be adjusted as by means of spring 7, inasmuch as the coil 8 is in shunt across the generator as indicated by means of wires 8 and 9. 10 represents a similar core normally pressed as by adjustable spring 11 in such direction as to tend to compact the pile 4 and decrease the resistance thereof. The coil 12, surrounding core 11, when energized, tends to move the same against the action of spring 11 so as to decrease the pressure upon the carbon pile 4 and prevent the generator current output exceeding a certain predetermined limit, adjustable as by spring 11 inasmuch as the said winding 12 is in series with the generator. Therefore with these instrumentalities which are shown in common in both figures, there are shown therein generators automatically regulated in such manner that their current output and voltage cannot exceed certain predetermined limits. In Fig. 1 the positive lead 13 is carried from the brush 2 to the positive side of the storage battery 14 and to one end of the carbon pile 15, the opposite end of which is in electrical connection with the movable member 16 from which the main 17 is carried to one side of the lamps or other translating devices 18, the opposite side of which is carried to the main 19 in communication with the negative side of storage battery 14 and one terminal of the automatic switch 20. The opposite terminal of the automatic switch 20 is connected as by the wire 21, through the coil 12 with the negative brush of the generator. From a suitable point in the storage battery 14, as for example the plate 22, the wire 23 is led to one end of the carbon pile 24, the other end of which is in electrical communication with the member 16. The movable member 16 is carried upon the pivoted lever 25 which is normally drawn downwardly by the adjustable spring 26 in such manner as to compress pile 15 and relieve the pressure on the pile 24; this action tending to reduce the resistance of the pile 15 and simultaneously increase the resistance of the pile 24. The lever 25 carries the core of iron 27, surrounded by the solenoid 28 in shunt across the translation circuit as indicated. The solenoid 28, when energized, tends to lift the core 27 and thus decrease the pressure upon the pile 15 and increase the pressure upon the pile 24.

In Fig. 2, the positive generator lead 29 is shown as carried from the positive brush 2 to the junction point 30 from whence the wire 31 is carried to the positive side of the storage battery 32, the negative side of which is connected to the wire 33 in communication with the negative side of the lamps or other translating devices 34 and one terminal 35 of the automatic switch 36. The opposite terminal 37 of the said switch is connected through the coil 12 as indicated with the negative brush of the generator 1. From the junction point 30, the wire 38 is carried to one end of the carbon pile 39, the opposite end of which is in electrical communication with movable member 40, communicating with the wire 41, which is carried to the positive side of the translating devices 34. The member 40 is in electric communication with one end of the carbon pile 42, the opposite end of which is connected as by wire 43 with the auxiliary brush 44 of the generator 1. The member 40 is carried by the pivoted lever 45 normally drawn in such direction by spring 46 as to tend to increase the pressure upon the pile 39 and decrease the pressure upon the pile 42. The lever 45 is provided with an iron core 54, surrounded by the solenoid 47, which, when energized, tends to lift the core in such manner as to decrease the pressure upon the pile 39 and increase the pressure on the pile 42. One end of the solenoid 47 is connected with the wire 41; the other end is carried to one end of the small carbon pile 48, the opposite end of which is in electrical communication with the lever 49 which is electrically connected as by wire 55 with the wire 33. The lever 49 is normally drawn downwardly by the adjustable spring 50 in such manner as to decrease the pressure upon the pile 48 and increase its resistance, while the limit of motion that can be caused by the spring 50 may be adjusted by the adjustable screw 51. The lever 49 is provided with an iron core 52, surrounded by solenoid 53 in shunt across the translation circuit. Energization of the coil 53, tends to lift the core 52 in such manner as to compress the carbons 48 and lower the resistance thereof.

The operation of my invention is substantially as follows:—If the dynamo, Figs. 1 and 2, be started, current will flow from the positive brush 2 through the field 3, carbon pile 4, and return to the generator and the field will build up in a well known manner. Current will also flow through wire 8, coil 6, wire 9, to the generator and I so adjust the spring 7 that when the maximum desired voltage is reached across the generator the pressure upon the pile 4 will be reduced and its resistance increased in such manner that this voltage will not be exceeded by the generator. If the generator voltage be brought up to that point at which the switch 20 in Fig. 1, or the switch 36 in Fig. 2, be set to close and if this voltage be in excess of the voltage of the storage battery shown in the respective figures, current will flow to the respective batteries as will hereinafter be more fully explained. In practice, I find it advisable to so adjust these switches that they will open and close at substantially the battery voltage and it is obvious that any preferred form of such switches may be employed which will perform this function. As many such switches are well known in the art and the particular type thereof forms no part of my present invention, I have shown automatic switches operated by a simple shunt coil for the sake of simplicity merely to indicate that said switches are automatic and operated by difference of potential across the generator. In the system shown in Fig. 1, the battery charging current above mentioned will flow from the brush 2, through the lead 13, battery 14, switch 20, lead 21 and coil 12 to the generator, and this current will not at any time exceed a predetermined limit owing to the action of the coil 12 upon the resistance 4. With the lamps or other translating devices 18 thrown on, current will also flow from the generator, through carbon pile 15, member 16, wire 17 to the positive side of the translating devices from which return is made through the main 19. I now so adjust the spring 26 that if the voltage now impressed upon the generator circuit be equal or less than that desired across the translating devices, the spring 26 will hold the carbon pile 15 tightly compacted and its resistance at a minimum. This will increase the resistance 24 to its maximum and if this be properly designed, the wire 23 may be considered under these conditions as open circuited, for all practical purposes. If now, the voltage across the generator circuit shall rise, for example as the generator speed increases, the charging of the battery proceeds, and the voltage across the translating devices tends to increase beyond that desired, the coil 78 and the parts operated thereby are so arranged that the spring 26 will yield and the coil 28 will cause the core 27 to be raised and the resistance of the pile 15 gradually increased in such manner as to tend to cut down the voltage upon the translation circuit. The pile 24 is so arranged that this action of the coil 28 will, at the proper time, increase the pressure upon the pile 24 and decrease the resistance thereof as the resistance of the pile 15 is increased and in this way shift the load of the translating circuit from across the full battery circuit to across a portion of the battery having a lower voltage than the entire battery. In this way the voltage across the translation circuit is held from rising beyond its predetermined limit as above described. If the voltage of the generator now fall, the voltage upon the translation circuit will be held at the normal, as a cycle the reverse of the above outlined will be carried out.

In the system shown in Fig. 2, if the translating devices 34 be in circuit current will flow from the junction point 30, through wire 38, carbon pile 39, member 40, wire 41, translating devices 34 to wire 33. Current will also tend to flow from the wire 41 through the coil 47, resistance 48, lever 49 and wire 55 to lead 33 and current will also flow through solenoid 53. If the voltage across the generator circuit be equal or below the normal voltage desired across the translating devices I so adjust the spring 50 and the screw 51 that there will be very slight pressure upon the carbon pile 48 and the resistance of the said coil will be high, then the current in the winding 47 will be quite small and I adjust the spring 46 so that the maximum pressure is exerted upon the pile 39 which will then have its minimum resistance. Under these conditions the pile 42 will have its maximum resistance and the said pile is so arranged that under these conditions this resistance may, for all practical purposes, be considered as an open circuit. If now, the voltage across the generator circuit shall rise, the voltage across the translating devices will also tend to rise and the coil 53 and the mechanism operated thereby is so arranged that this rise above the normal will move the lever 49 against the action of the spring 50 and compress the pile 48 and reduce its resistance. This will increase the current in the coil 47, which in turn, will lift the lever 45 against the action of spring 46 and increase the resistance 39 in such manner as to hold the voltage on the translation circuit substantially constant. At a proper point in the motion of the lever 45, the resistance of the pile 42 will be greatly reduced and may be considered almost negligible under certain conditions at which time, the resistance of 39 will be considerable and very little current will flow therethrough. At this time most of the current supplied to the translating devices will flow from the auxiliary brush 44, through wire 43, carbon pile 42, member 40 and wire 41 and as this current is tapped from a brush upon the commutator at a point of lower voltage than the main positive brush, and the voltage of which may be readily adjusted by selecting the proper position of the brush 44, the lamps or other translating devices may be fed at a considerably lower voltage than that necessary to charge the battery without having in series therein a resistance of such value as will cause appreciable loss or trouble in the manner of the dissipation of heat. If now, the voltage across the translating devices shall fall, a cycle the reverse of the above outlined will be gone through and the translation circuit main 41 will be in effect, gradually shifted from connection with the brush 44 to connection with the brush 2 in an obvious manner.

From the foregoing, it will be plain that I have produced a means for holding the voltage upon a translation circuit substantially constant throughout the rise necessary to charge a storage battery which may be charged from a generator supplying also the said translation circuit without making such regulation wholly dependent upon the dissipation of the energy due to the difference of potential of the respective circuits in the form of heat. Thus I have produced a simple and more efficient system for this purpose.

I do not wish in any way to limit myself to the details shown in the accompanying drawing, which is a mere diagrammatic representation of two types of system embodying my invention, for it is obvious that wide departures may be made therein without departing from the spirit and scope of my invention, which is as set forth in the following claims:—

1. A system of electric regulation comprising a pair of sources of electrical energy; a circuit to be supplied thereby and means responsive to the voltage of said circuit for governing the voltage across said circuit; said means comprising devices for regulating the effect of one source and correspondingly and simultaneously regulating the effect of the other of said sources.

2. A system of electric regulation comprising a battery and a dynamo; a circuit to be supplied by said battery and said dynamo; and means connected to said circuit and controlled by the voltage across the same for governing the voltage across said circuit; said means comprising a plurality of resistances connected to said battery and dynamo and devices acting to increase the effect of one of said resistances while decreasing the effect of the other.

3. A system of electric regulation comprehending a pair of sources of electrical energy; a circuit to be supplied thereby; a regulating element in circuit with one of said sources; another regulating element in circuit with a portion of the other of said sources; and means actuated by the voltage across said circuit for controlling said regulating elements so as to keep the voltage across said circuit substantially constant.

4. A system of electric regulation comprehending a pair of sources of electrical energy consisting of a battery and a dynamo; a circuit to be supplied thereby; a regulating element connected to one of said sources; a regulating element connected to a portion of the other of said sources; said elements being in parallel with each other; and means controlled by the voltage across the said circuit for actuating said elements so as to keep the voltage across said circuit substantially constant.

5. An electric system comprehending a generator; a storage battery; a translation circuit connected to said generator and said battery; and means for controlling the voltage upon the translation circuit comprising a voltage regulating element connecting the translation circuit with the generator; a voltage regulating element connecting the translation circuit with a point of the system having lower voltage than across the generator circuit; and means for actuating said voltage regulating elements in response to voltage fluctuations across the translation circuit.

6. An electric system comprehending a generator; a storage battery charged thereby; a translation circuit and means for controlling the voltage upon the translation circuit comprising a voltage regulating element connecting the translation circuit with the generator circuit; a voltage regulating element connecting the translation circuit with a point of the system having lower voltage than across the generator circuit; and means for actuating said elements so as to increase the effect of one while decreasing the effect of the other, in order to keep the voltage across the translation circuit constant.

7. An electric system comprising a source of current; means for delivering current therefrom at different voltages; a translation circuit; voltage-controlling means in circuit with the first means; and automatic means governed by conditions in the translation circuit for operating the said controlling means.

8. An electric system comprising a source of current; means for conducting current therefrom; means for conducting current from said source of a different voltage with respect to the first means; controlling means in circuit with both of said conducting means; and automatic means governed by working conditions for operating the controlling means.

9. A system of electric regulation comprising a source of current in the translation circuit, said source including a battery, a variable resistance connected with said translation circuit, a tap connected with said battery, a second variable resistance connected to said tap and the said translation circuit, and means for controlling both said resistances in accordance with conditions in the translation circuit.

10. A system of electric regulation comprising a battery and a dynamo; a translation circuit; a variable resistance connected with said translation circuit; a variable resistance connected with a portion of the battery and the said translation circuit; and means for controlling both of said resistances in accordance with conditions in said circuit.

11. A system of electric regulation comprising a battery; a dynamo; a translation circuit; a variable resistance having one end connected to the battery and dynamo and the other end connected to the translation circuit; a second variable resistance having one end connected to a portion of the battery and the other end connected to the translation circuit; and means for simultaneously controlling said resistances in response to voltage fluctuations across the translation circuit.

JOHN L. CREVELING.

Witnesses:
M. HERSKOVITZ,
A. E. TUERS.

Copies of this patent may be obtained for five cents each, by addressing the "Commissioner of Patents, Washington, D. C."